United States Patent [19]

Bennett et al.

[11] Patent Number: 4,510,023

[45] Date of Patent: Apr. 9, 1985

[54] PERFORATED BUBBLE CAPS FOR ENHANCED VAPOR/LIQUID CONTACT ON A DISTILLATION TRAY

[75] Inventors: Douglas L. Bennett, Macungie; Thomas J. Edwards, Allentown; Howard C. Rowles, Center Valley, all of Pa.

[73] Assignee: Air Products and Chemicals, Inc., Allentown, Pa.

[21] Appl. No.: 505,548

[22] Filed: Jun. 17, 1983

[51] Int. Cl.³ .............................................. B01D 3/20
[52] U.S. Cl. ..................................... 203/99; 202/158; 261/114 A; 261/114 TC
[58] Field of Search ............... 202/158, 162, 152, 153, 202/163; 203/99; 261/114 A, 114 TC, 114 PR, 114 UT, 114

[56] References Cited

U.S. PATENT DOCUMENTS

| 1,821,619 | 9/1931 | Day | 202/158 |
|---|---|---|---|
| 2,091,349 | 8/1937 | Bergman | 202/158 |
| 2,578,881 | 12/1951 | Dunn | 261/114 A |
| 2,600,710 | 6/1952 | Wade | 261/114 A |
| 2,692,128 | 10/1954 | Bowles | 261/114 |
| 2,699,929 | 1/1955 | Bowles | 261/114 |
| 2,871,003 | 1/1959 | Galbreath | 261/114 A |
| 4,101,610 | 7/1978 | Kirkpatrick et al. | 202/158 |
| 4,233,269 | 11/1980 | Kaye et al. | 261/114 A |

FOREIGN PATENT DOCUMENTS

| 2020884 | 11/1971 | Fed. Rep. of Germany | 261/114 R |
|---|---|---|---|
| 0151672 | 11/1962 | U.S.S.R. | 261/114 R |

OTHER PUBLICATIONS

W. L. Bolles, "Optimum Bubble Cap Tray Design", Petroleum Processing, Mar. 1956, p. 89.
W. L. Bolles, Petroleum Processing, Apr. 1956, p. 75.
Unit Operations of Chemical Engineering, McCabe and Smith, 1956, pp. 734-735.

Primary Examiner—Wilbur Bascomb
Assistant Examiner—Virginia Manoharan
Attorney, Agent, or Firm—Russell L. Brewer; E. Eugene Innis; James C. Simmons

[57] ABSTRACT

This invention relates to a distillation system for effecting separation of a multicomponent fluid and to an improved bubble-cap design which can accommodate very wide ranges of vapor and liquid loadings. A portion of the tray is provided with bubble caps having first and second slot openings with the second slot opening at an elevation higher than the first opening.

16 Claims, 5 Drawing Figures

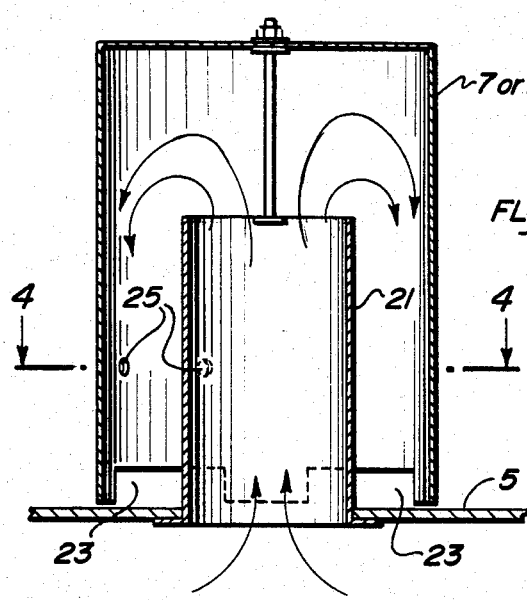
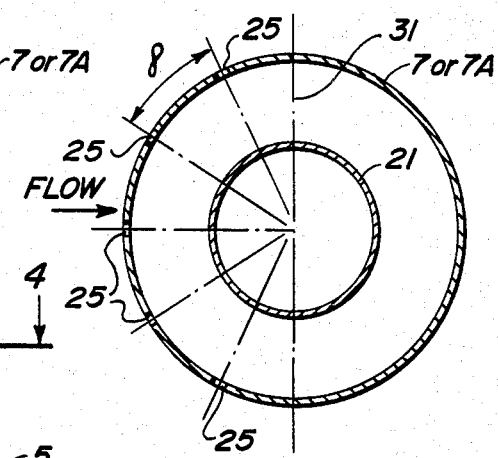
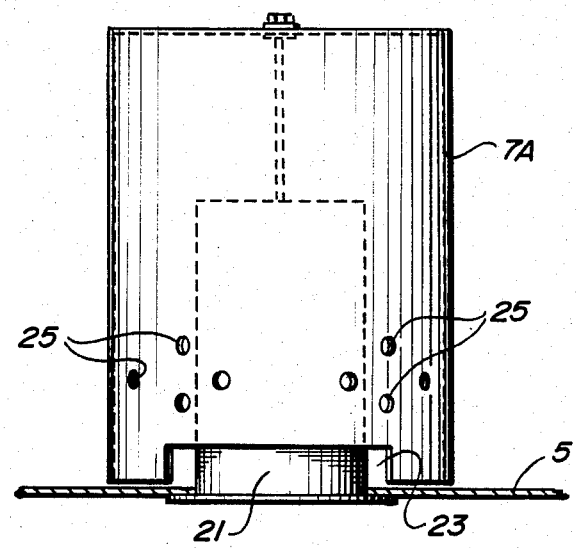

PERFORATED BUBBLE CAPS FOR ENHANCED VAPOR/LIQUID CONTACT ON A DISTILLATION TRAY

TECHNICAL FIELD

This invention relates generally to a distillation system for effecting separation of a multicomponent feed, and particularly to an improved bubble-cap type tray which can accommodate very wide ranges of vapor and liquid loadings.

BACKGROUND OF THE PRIOR ART

One of the objectives in the separation of multicomponent feeds in a distillation column utilizing bubble trays is to effect uniform and intimate vapor contact with the liquid on the tray. Bubble-cap type trays are preferred where low vapor rates must be accommodated since they are not subject to weeping as are sieve trays or valve trays, which substantially reduces mass transfer efficiency. In order to achieve uniform and intimate vapor contact it is known that vapor flow through the bubble caps should be substantially uniform in order to achieve the maximum mass transfer efficiency.

One of the problems associated with bubble-cap trays in distillation columns is instability at low vapor rates. In some cases where the vapor load to the tray is extremely low there may be instances where there is vapor flow through a small portion of the caps and little to no vapor flow through the other caps on the tray. When this condition occurs, liquid bypasses the caps which have vapor flow and avoids vapor contact, resulting in very loss mass transfer efficiency. Instability often is caused by varying pressure seals above the caps on a tray due to the hydraulic gradient inherently caused by the flowing liquid, or due to unlevelness of the tray.

Another problem in the operation of distillation columns has been associated with the distillation of multicomponent feeds where the vapor and liquid loads vary over a wide range. Vapor loads to the trays in the column can vary because of changing concentrations of more volatile component in the feed or alternatively because of variations in the feed flow rate to the column. Liquid loads to the tray will also vary because of changing feed composition or feed rates. Bubble-cap trays normally are limited to design turndown ratios of about 4-8:1 (the ratio of the volume of vapor passing through the cap at design velocity compared to the volume of vapor passing through the cap at minimum acceptable velocity and the ratio of the volume of liquid at design rate to the volume at minimum rate). The following are representative turndown ratios of other distillation devices: packed columns 3:1, sieve trays 2-4:1, and valve trays, 4:1. These columns normally have more limited turndown ratios than bubble-cap trays. Generally, the turndown ratio implies equal turndown for both liquid and vapor on a tray. Such a result is not normally the case, however, with changing feed compositions.

Several techniques have been developed as shown by the prior art to correct instability of trays, e.g. the instability being caused by the hydraulic gradient across the bubble tray or unlevelness. In an article "Optimum Bubble Cap Tray Design" by W. L. Bolles, *Petroleum Processing* (March, 1956), page 89, (see also U.S. Pat. No. 2,699,929 and U.S. Pat. No. 2,692,128), the author suggests the use of stepped-level bubble caps to correct tray instability. In the Bolles design, the bubble caps are positioned at various levels above the tray so that the bubble cap elevation below the surface of the liquid component is substantially the same across the tray. By matching the height of the bubble cap to the liquid head, the pressure seal over the bubble caps is substantially equal, if vapor and liquid rates are maintained at essentially the same ratio.

In the continuation of the Bolles article in *Petroleum Processing* (April, 1956), page 75, the author suggests that tray instability also can be corrected at low vapor loads by blanking off some rows of caps on the bubble tray where such low vapor loads are anticipated.

In a text entitled *Unit Operations of Chemical Engineering* by McCabe and Smith (1956), page 734-735, the authors suggest a procedure similar to Bolles to correct plate instability in large columns. This is accomplished by causing the liquid to flow only across a portion of the plate.

U.S. Pat. No. 2,871,003 discloses a valve-type bubble cap having a built in vapor flow adjuster. The cap utilizes a diaphragm to govern the amount of vapor leaving the cap. Ports of variable size are incorporated into the cap and the diaphragm opens or closes the ports depending upon the vapor pressure. Sticking or freezing of the diaphragm would result in weeping and reduced efficiency since the caps have no risers.

It is also known that trays incorporating bubble caps have been designed to handle a wide range of vapor loads, e.g. turndown ratios of 10-60:1 due to changes in feed composition or feed rates to the column. One of the known techniques is to establish a plurality of separation zones on a tray with each separation zone having a distinct liquid head, i.e. a distinct and substantially equal pressure seal above the bubble caps in that separation zone. Each separation zone has a pressure seal or head different from the pressure seal or head in another zone. The magnitude of the pressure seal in each separation zone is preselected, usually greater than the hydraulic gradient or unlevelness, so that at low vapor velocities only one or perhaps two separation zones on the tray are operable. As the vapor load to the tray is increased, other separation zones become operable. Two techniques for zone formation as described are suggested. One technique is to section the tray by placing weirs of different height on the tray and perpendicular to liquid flow. Since the height of each weir is different, the liquid level and pressure seal in each zone is different from another separation zone. The creation of separation zones of different liquid level creates zones of different pressure seals. At the lowest vapor load, then, only that zone with the smallest pressure seal is operable. Since the zone with the smallest pressure seal must necessarily be at the liquid outlet, tray leakage will result in bypassing of the active zones.

Another technique for zone formation involves setting the liquid level on the tray at a predetermined level and then adjusting the height of the bubble caps above the floor. However, instead of matching the height of the liquid gradient as in Bolles, the height of the bubble caps below the liquid level is varied much more dramatically so that the pressure seals are substantially different. One difficulty with the stepped level arrangement of bubble caps along the tray is that the resistance to liquid flow across the tray is increased and the increased resistance exacerbates the liquid gradient. Greater power may be required because of the increased resistance imparted to liquid flow. A second disadvantage of both techniques is that the substantial difference in pressure seals results in significant imbalance in vapor flow over the entire operating range of the tray, with a corresponding reduction in mass transfer efficiency in the higher range of operating rates.

Another technique which has been used to enhance tray stability incorporates a perforated inlet weir to initiate frothing. However, at low vapor rates such weirs exhibit substantial weeping through the perforations resulting in substantial loss of mass transfer efficiency.

The use of bubble caps having an elevated frontal skirt portion has been suggested but these too are affected by tray levelness and result in reduced mass transfer efficiencies at higher operating rates.

SUMMARY OF THE INVENTION

This invention relates to an improvement in a bubble cap distillation process for separating a volatile component from a less-volatile component in a multicomponent feed. Conventionally, in such distillation processes the multicomponent feed is charged to a distillation column having a plurality of trays having bubble caps thereon for effecting separation of the volatile components from the less-volatile components. In operation, vapor is generated in the column and it first passes through a perforation in the tray, then through a riser within the bubble cap and then through slot sections in the perimeter of the bubble cap for contact with the liquid component on the tray. The contact of the vapor with the liquid establishes frothing or bubbling and such contact and bubbling aids in the separation of the volatile components from the less-volatile components. This procedure is repeated at each tray in the column and finally an overhead fraction rich in volatile components and a bottoms fraction rich in less-volatile components is obtained.

The improvement in the plate or tray design resides in the utilization of a plurality of unique bubble caps having a riser section but each having first and second slot sections below the liquid level on the tray. The second slot sections are placed in the perimeter of the cap surface between the riser outlet and first slot openings. The elevation is selected so that the second slot openings are at a level below the liquid level but at a depth such that the liquid head or pressure seal above the second series of slot sections is signficantly less than the liquid head or pressure seal above the first slot sections. In addition the second slot sections in each unique cap should have a total cross-sectional area of from about 5 to 30% of the total cross-sectional area of the first slot sections in each cap. Generally these unique caps are installed in selected rows on the tray and comprise 5-30% and typically 10 to 20% of the total caps on the tray.

The invention also relates to the bubble caps having risers and first and second slot sections, and to the trays utilizing these unique bubble caps.

There are several advantages associated with utilization of the unique bubble caps and these include:

a mechanism for permitting a high degree of separation efficiency over a wide range of vapor and liquid loads to the tray;

a mechanism for easy inspection of the tray to determine the number and location of unique bubble caps upon the tray;

a mechanism for handling low vapor flow rates without exacerbating the hydraulic gradient as is inherent in the stepped-level bubble cap design;

a mechanism for utilizing one tray design within a column which will handle a wide range of both vapor and liquid loads as well as handle changing loads with respect to each other without blanking off portions of the tray;

a mechanism for providing uniform vapor/liquid contact across the width of the tray without substantial weeping as is inherent with perforated inlet weirs; and flexibility for installation on the tray so that in multi-segmented trays the distillation efficiency may not be substantially impaired because of liquid weeping through the joints of the various segments.

BRIEF DESCRIPTION OF THE DRAWINGS

FIG. 3 is a view of an individual bubble cap as seen from the plane 3—3.

FIG. 4 is a cross-sectional view of the bubble cap shown in FIG. 3 as seen along the plane 4—4.

FIG. 5 is a cross-sectional view of a bubble cap having a plurality of second slot openings at different elevations.

DETAILED DESCRIPTION OF THE INVENTION

Conceptually, the invention can be viewed as an improvement in a mechanism for establishing a smaller bubble tray distillation column or subsection within a larger column in order to permit the column to handle very wide vapor load and liquid load ranges.

To aid in understanding the mechanism for establishing a distillation subsection within a larger distillation column reference is made to the drawings.

Figure 1:
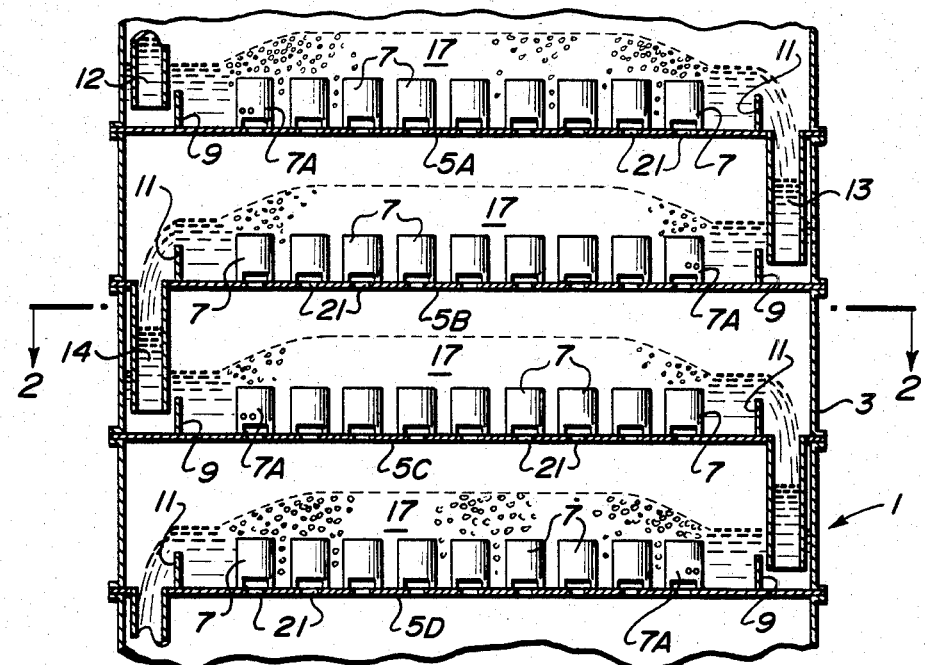
FIG. 1 is a cross-sectional view of a conventional bubble cap distillation column showing four bubble trays with the exception that the trays incorporate one row of the unique bubble caps thereon.

FIG. 1 is a cross-sectional view of a distillation column 1. Distillation column 1 has a shell section 3 which carries a plurality of trays or plates 5 (A–D) which are perforated to permit vapor to rise through the plate and upwardly through the column. A plurality of bubble caps 7 are positioned on trays 5 in sealing arrangement with the trays so that riser portions 21 in the caps extend over the perforations on the tray. Inlet weirs 9 and outlet weirs 11 are placed at end sections of trays 5 and are used to maintain liquid on the tray at a specific level above the tray.

In operation, a multicomponent feed is introduced to distillation column 1 via means not shown. As the feed is fractionated, liquid fractions are formed which flow downwardly in the column and vapor fractions are formed which flow upwardly. The liquid as it flows downwardly in the column is fed to trays 5A and 5B through downcomers 12 and 13, respectively. For example, liquid is fed to tray 5A from downcomer 12 and caused to flow over inlet weir 9, bubble caps 7, outlet weir 11 and exit the tray through downcomer 13. As liquid passes across tray 5A, it is contacted with vapor generated below. Contact is made during passage of the vapor via the perforations in the tray through bubble caps 7. Since the openings in bubble caps 7 are below the liquid level, vapor contact is made with the liquid. At design velocities the vapor is intimately mixed with the liquid and establishes a froth zone 17. This is repeated in tray 5B with liquid entering via downcomer 13 and exiting via downcomer 14.

Figure 2:
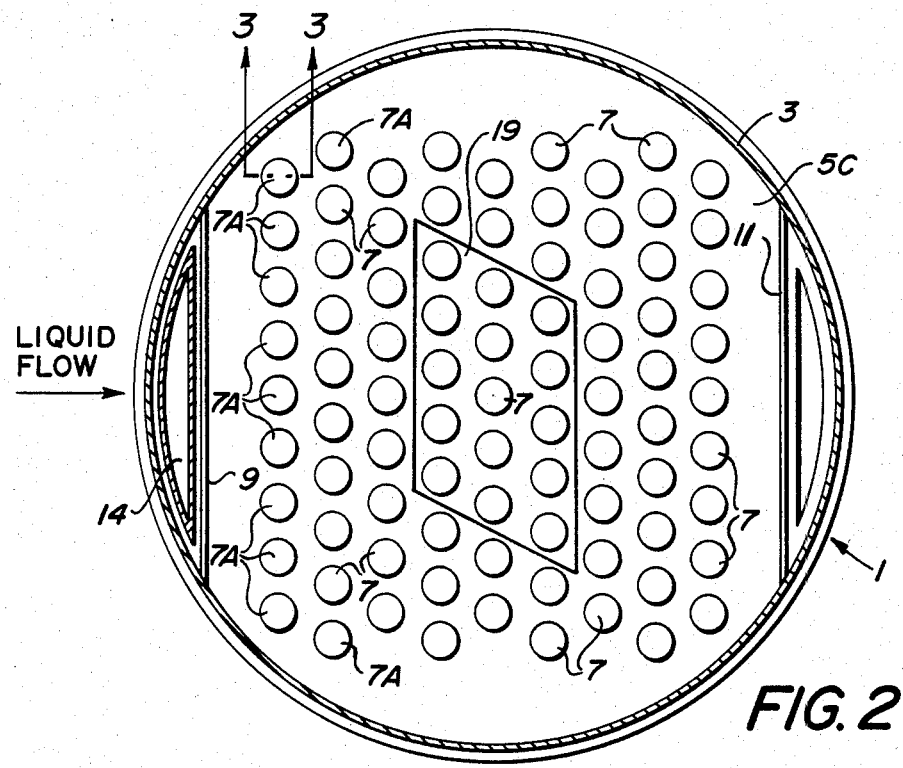
FIG. 2 is a top view of a tray as viewed from the plane 2—2.

FIG. 2 represents a view of the tray as seen in the direction indicated by plane 2—2. This figure illustrates the use of a staggered arrangement (triangular centers) of bubble caps on the tray so that the frothing zone will extend more uniformly across the tray. If the caps were in nonstaggered row sections, liquid would flow across the tray with less uniform contact with the vapor. A staggered arrangement is conventional and is normally preferred.

As detailed in FIG. 3, bubble caps 7 have riser sections 21 which in practice are disposed over and above perforations in tray 5. The perforations permit vapor to pass to and through riser sections 21 in caps 7 as indicated by arrows. Each riser section 21 has an outlet at a level preferably above the outlet weir elevation on the tray to prevent weeping of liquid at low vapor rates. Such feature is in contrast to valve-type bubble caps which do not utilize risers.

Conventional bubble caps, e.g. round bubble caps, rectangular bubble caps, tunnel-type bubble caps and other bubble cap configurations have a plurality of first slot sections 23 positioned below the outlet of riser section 21 and yet positioned so that they are above the floor of tray 5 and below the liquid level. Vapor exiting the outlet of riser section 21 then passes through first slot sections 23 and contacts the liquid flowing across the tray.

The bubble caps which permit the tray to handle very wide vapor load and liquid load ranges without instability due to hydraulic gradient and unlevelness, e.g. turndown ratios of 8–100:1 are best illustrated in FIGS. 3, 4 and 5.

The difference between the bubble caps 7A described herein from those conventional bubble caps 7 described and used heretofore lies in the establishment of a plurality of second slot openings 25 in the bubble caps. The first row of bubble caps on trays 5 in FIG. 1 are so equipped. Second slot openings 25 are positioned between the outlet of riser section 21 and slot openings 23 and yet at a distance below the outlet of the riser section such that second slot openings 25 are below the liquid level to insure vapor bubbling through the liquid continuous region of the two phase froth at all vapor rates. The distance between second slot openings 25 and first slot openings 23 should also be sufficient to provide a pressure seal difference greater than the liquid gradient or tolerance standards for levelness of the tray. If the distance between the liquid level on the tray and first slot openings 23 is expressed as Z1 and the distance between the liquid level and the second slot openings 25 as Z2, the ratio of Z2 to Z1 should preferably be from about 0.1 to 0.5:1.

In creating a distillation subsection on trays 5, bubble caps 7A with second slot openings 25 are positioned on the tray in one or more cap rows generally near the liquid inlet section of the tray (note arrow indicating liquid flow direction in FIG. 2). This arrangement is certainly preferred in trays which have multiple sections. For example, a large column may have manways, e.g. manway 19 to permit tray installation, inspection and repair. The trays may also be sectioned for ease of installation. In time liquid will often weep through the tray at sectioned portions of the tray or at manways because of inadequate sealing. Of course, when liquid weeps through the tray, it may not encounter vapor contact. By locating unique bubble caps 7A with first and second slot sections near the liquid inlet, the liquid is contacted uniformly with vapor before it has a chance to weep through the tray. Trays which have little to no liquid weepage may have the unique bubble caps 7A placed in rows intermediate between the inlet and outlet or near the outlet. However, by locating unique bubble caps 7A near the liquid inlet, more uniform bubbling is achieved at high flows since the extra slot area is offset by the higher liquid gradient.

The bubble caps 7A with second slot openings 25 must comprise at least one row across the full width of the liquid pathway on the tray to obtain uniform vapor/liquid contact in these rows at low vapor rates, such that liquid cannot bypass around the caps. The unique bubble caps 7A should preferably comprise not more than 10 to 20% of the total caps on the tray, nor more than three cap rows on the tray, in order to avoid preferential bubbling among the unique caps, with resultant liquid bypassing. Thus, the balance of the bubble caps would only have first slot openings 23. When a larger percentage of unique caps are used, there is a tendency for the tray to experience reduced mass transfer efficiency due to liquid bypassing, because all caps in a single row may not be active. An exception would be on small trays comprising only 2 to 5 rows of caps, where the minimum one row of unique caps might comprise 20 to 50% of the total caps.

In a preferred embodiment, second slot openings 25 are placed in bubble caps 7A generally in an area facing upstream of the cap surface. This is more clearly illustrated in FIG. 4. Assume an imaginary plane 31 cuts through the center of bubble cap 7A and liquid flow across the tray is in the direction of the arrow. Second slot openings 25 then are uniformly placed about the face of the cap upstream from that plane. In the specific embodiment shown, the angle 8 between slot sections is 30°. Other angles can be used but, as mentioned, angle 8 should be substantially the same to effect uniform contact with the liquid as it flows around the bubble cap. In this way uniform and maximum vapor contact is made with all of the liquid as it passes unique bubble cap 7A and flows around its surface. When second slot openings 25 are located downstream from plane 31 they do not have the same performance characteristics as the slot openings upsteam of plane 31. Although second slot openings 25 can be positioned uniformly about the cap no significant advantages are achieved and as stated it is preferable to position these slot openings upstream of plane 31.

Second slot openings 25 can be at one elevation as shown in the caps of FIG. 3 or they can be in multiple elevations as in the caps of FIG. 5. When second slot openings 25 are at different elevations, the same criteria for cross-sectional area holds as when they are at the same level. However, the individual size of the openings for second slot sections 25 may vary. When second slot openings 25 are at one elevation, they should be of substantially the same size so that there will be little variation in vapor flow through the cap since the pressure seal at that elevation would be substantially the same for all openings. The number of second slot openings 25 then will be dependent upon the cross-sectional area required and the hole diameter or opening selected. When second slot openings 25 are at different elevations in the cap, it may be desirable to increase the size of the slot openings slightly as the pressure seal increases. In this way, the vapor velocity through all of the second slot openings will tend to be more uniform since the smaller slot openings having the least pressure seal will tend to act as vapor restrictions vis-a-vis the larger slot openings having a greater pressure seal. Both the first and second slot openings may consist of perforations, slots, open-ended or closed-end rectangular or triangular notches, or combinations thereof. Of course the size, shape and number of second slot openings should be selected so that the installation of the openings does not create substantial machining or manufacturing difficulties. Two or more levels of second slot openings may be advantageous to offset effects of tray fabrication and installation tolerances, e.g., tray levelness and cap elevation. At least one elevation on each cap will then bubble preferentially regardless of installation differences.

The cross-sectional area of the second slot openings is from 5–30% of the area of the first slot openings. The area preferably selected within this range to provide a desired slot vapor velocity at the lowest vapor rate. For example, if a vapor turndown ratio of 100:1 is required, a second slot area of 10% of the first slot area in each cap, while limiting the number of unique caps to 10% of the total caps, might be utilized to provide the same vapor velocity at minimum vapor flow as at maximum vapor flow. Therefore, in some cases, it may be preferable that the cross-sectional area of the second slot openings be less than 30% of the area of the first slot openings so that a desirable vapor velocity will result. A maximum area of 25–30% in each cap and higher utilization of unique caps, e.g. 20% of the total caps may be preferable so that at high vapor rates, the preferential bubbling from the second slot openings is not sufficient to cause a significant loss of mass transfer efficiency.

In operation, tray 5 will have a plurality of bubble caps thereon with at least one row comprising unique caps 7A. The riser sections 21 of unique bubble caps 7A will be disposed over perforations in the tray, preferably near the liquid inlet. Second slot sections 25 are located preferably in the upstream portion of the bubble caps. The remaining bubble caps on the tray will be of conventional type 7, having only first slot openings 23. Inlet and outlet weirs 9 and 11 located at the ends of the tray create a liquid level on the tray which is above first and second slot sections 23 and 25. The pressure seal for first slot openings 23 is equivalent to the liquid head Z1 above the openings and the pressure seal for second slot openings 25 is equivalent to the liquid head Z2 above the openings.

Under some liquid loads and at low vapor rates, vapor will exit second slots 25 in caps 7A uniformly and contact the liquid to establish frothing zone 17 across the full width of the tray. Since the pressure seal Z1 above first slot openings 23 is much greater than the pressure seal Z2 above second slot openings 25, no vapor will exit first slot sections 23 in any of the caps. At higher vapor rates the vapor pressure will be sufficient so that it will equal or exceed pressure seal Z1 and permit vapor flow through first slot openings 23. Of course some of the vapor will exit slot openings 25 at the higher vapor loads, but most will exit through slot openings 23 since the total cross-sectional area of slot openings 23 in all caps is much larger. By maintaining second slot openings 25 at relatively small cross-sectional area compared to first slot openings 23, second slot openings 25 act as vapor restrictors at the higher vapor rates and tend to force the vapor through first slot openings 23. This results in reduced entrainment of liquid above the tray, and in more uniform bubbling at higher vapor rates, with no loss of mass transfer efficiency. The principle of second slot openings can obviously be applied to types of bubble caps other than round, e.g. in rectangular, tunnel-type or other configurations which operate in essentially the same manner as bubble caps.

EXAMPLE 1

Air-water simulation tests were carried out to determine tray hydraulic performance with bubble caps having multiple first and second perforations therein at various vapor and liquid loadings. Ultimately, the trays were to be used in nitrogen rejection columns without further adaptation. It was expected that standard trays would not be acceptable since the liquid and vapor rates to the trays would change and shift dramatically within the columns. However, comparison tests were also made using standard bubble cap trays.

The test column comprised one tray having a diameter of five feet and equipped with an inlet weir having a height of 2 inches and a notched outlet weir having a height of 1 inch to the bottom of the notches. A total of 77 bubble caps were distributed on the tray, each cap having a diameter of 3 inches and placed on 4.5 inch triangular centers as illustrated in FIG. 2. There were 7 rows of caps counting from row 1 which was closest to the inlet to row 7 which was closest to the outlet. The number of caps in the rows 1–7 of the tray, respectively, were 10, 11, 12, 12, 11, 11, and 10.

The bubble caps used in evaluating the tray were 3 inches in diameter, 3 inches in height, and supported by three leg sections ¼ inch in width and 0.35 inches in height. Therefore, there were three first slot sections in each cap, each slot section having a circumferential width of about 2.9 inches and a height of 0.35 inches. This area is referred to as the skirt. Each cap had a riser 2 inches in diameter and 2¼ inches high.

Ten bubble caps having first and second (dual) slot openings were installed in the first row, and 2 in each of the outer positions in rows 2 and 3 for a total of 14 dual-slotted caps, so that the liquid pathway across the tray from inlet to outlet would be completely traversed and exposed to the dual-slotted caps. Each dual-slotted cap had five holes of ¼ inch diameter distributed about the frontal half of the circumference with the centerline 7/16 inch above the first slot or 0.788 inches above the bottom of the leg portion of the cap. These holes represented the second slot area 25 in bubble caps 7A. The holes were uniformly distributed about the circumference at 30° angle intervals from the front of the cap as shown in FIG. 4. The total cross-sectional area of second slots 25 in the 14 dual-slotted caps was 3.44 square inches and the total area of the first slot sections was 42.5 square inches. The additional first slotted area in the remaining 63 conventional caps was 191.3 square inches.

Table 1 sets forth data generated from a series of tests using air and water as a medium for investigating tray hydraulic performance with the dual-slotted caps. Two variables in tray operation were studied. These were the rate of liquid in gallons per minute (GPM) and the rate of vapor in actual cubic feet per minute (ACFM) to the tray. Various results were recorded at specific air and water flow rates. These include: an analysis of the bubbling pattern and cap performance, the vapor and liquid turndown ratios representing the maximum design rates of the tray divided by the actual rates in the test, the liquid height on the tray measured at the first and last row in inches (estimated to be within ±¼-½ inch), and the pressure drop in inches of water across the tray.

As further explanation, the vapor and liquid turndown ratios are based on the maximum design vapor and liquid rates for the tray design which was tested simulating the tray loads resulting from wide ranges of feed compositions and from variable feed rates. As a result, the maximum vapor and liquid rates experienced in the columns normally do not occur on the same tray or at the same feed composition. The term "perforated caps" in Table 1 refers to the 14 caps having both first and second slot sections. Alternatively, the expression "dual-slotted caps" may be used. The symbol F refers to a froth zone of very agitated bubbling and actual liquid height was not measurable.

TABLE 1

Tests With Dual-Slotted Caps

| Test No. | Gas Rate ACFM | Liquid Rate GPM | Vapor Turndown Ratio | Liquid Turndown Ratio | Tray Liquid Height 1st Row INCHES H₂O | Tray Liquid Height Last Row INCHES H₂O | Tray Δ P | Bubbling Pattern | Perforated Cap (14 of 77) Performance |
|---|---|---|---|---|---|---|---|---|---|
| 1 | 38 | 3.73 | 121:1 | 45:1 | 1½ | 1½ | 1.14 | Only holes in perforated caps are bubbling | |
| 2 | 38 | 5.88 | 121:1 | 29:1 | 1¾ | 1¾ | 1.22 | Only holes in perforated caps are bubbling | |
| 3 | 38 | 14.2 | 121:1 | 12:1 | 1¾ | 1¾ | 1.40 | Only holes in perforated caps are bubbling | |
| 4 | 38 | 18.0 | 121:1 | 9:1 | 2 | 2 | 1.49 | Only holes in perforated caps are bubbling | |
| 5 | 38 | 33.9 | 121:1 | 5:1 | 2⅛ | 2⅛ | 1.72 | Only holes in perforated caps are bubbling | |
| 6 | 38 | 41.5 | 121:1 | 4:1 | 2¼ | 2¼ | 1.72 | Only holes in perforated caps are bubbling | |
| 7 | 38 | 78.3 | 121:1 | 2.1:1 | 2½ | 2½ | 1.97 | Only holes in perforated caps are bubbling | |
| 8 | 38 | 85.1 | 121:1 | 2:1 | 2½ | 2½ | 2.20 | Only holes in perforated caps are bubbling with middle 2 caps in outlet row 7 | |
| 9 | 38 | 106.6 | 121:1 | 1.6:1 | 2¾ | 2¾ | 2.11 | Only holes in perforated caps are bubbling with middle four caps in outlet row 7 | |
| 10 | 38 | 150.2 | 121:1 | 1.1:1 | 3 | 3 | 2.24 | Only holes in perforated caps are bubbling | |
| 11 | 233 | 0.24 | 20:1 | 700:1 | — | — | — | No bubbling. Tray went dry due to leakage. Not a valid test (below required liquid turndown). | |
| 12 | 233 | 0.78 | 20:1 | 210:1 | 1¼ | 1¼ | 0.78 | Even | Both skirt and holes bubbling |
| 13 | 200 | 3.84 | 23:1 | 44:1 | 1½ | 1½ | 0.94 | Even | Both skirt and holes active |
| 14 | 203 | 78.7 | 23:1 | 2:1 | 2½ | 2½ | 1.88 | Fully active. Last two rows most active | Both skirt and holes active |
| 15 | 260 | 104.9 | 18:1 | 1.6:1 | 2¾ | 2¾ | 2.10 | Only holes in perforated caps bubbling with all of outlet row 7 and half of row 6 | |
| 16 | 203 | 154.5 | 23:1 | 1.1:1 | 3 | 3 | 2.32 | Only holes in perforated caps bubbling with all of outlet row 7 and 3 caps in row 6. | |
| 17 | 432 | 7.4 | 11:1 | 23:1 | 1⅝ | 1⅝ | 1.27 | Fully active. First and last rows most active | Both skirt and holes bubble |
| 18 | 432 | 74 | 11:1 | 2.3:1 | 2½ | 2⅜ | 1.93 | First row and part of rows 5, 6 & 7 bubble. Liquid bypassing at rows 5-7. | Only holes bubbling |
| 19 | 550 | 78 | 8:1 | 2.2:1 | 2½ | 2⅜ | 1.99 | First row and part of rows 5, 6 & 7 bubble. Liquid bypassing at rows 5-7 | |
| 20 | 769 | 19.0 | 6:1 | 9:1 | 2 | 2 | 1.52 | Almost fully active, 6 caps in middle of rows 2, 3 & 4 not bubbling | |
| 21 | 769 | 33.0 | 6:1 | 5:1 | 2¼ | 2¼ | 1.68 | Almost fully active, 4 caps in middle of rows 2 & 3 not bubbling | |
| 22 | 769 | 146.0 | 6:1 | 1.2:1 | 3¼ | F | 2.58 | Uneven except last three rows | Only holes bubbling |
| 23 | 1192 | 5.28 | 4:1 | 32:1 | 1½ | 1½ | 1.32 | Tray fully active, all caps bubbling | |
| 24 | 2000 | 4.32 | 2.3:1 | 39:1 | 1½ | 1½ | 1.52 | Agitated bubbling on whole tray | |
| 25 | 1846 | 6.24 | 2.5:1 | 27:1 | 1½ | 1½ | 1.54 | Tray fully active, all caps bubbling | |

TABLE 1-continued

| | | | | | Tests With Dual-Slotted Caps | | | | |
|---|---|---|---|---|---|---|---|---|---|
| | | | | | Tray Liquid Height | | | Comments | |
| Test No. | Gas Rate ACFM | Liquid Rate GPM | Vapor Turndown Ratio | Liquid Turndown Ratio | 1st Row | Last Row | Tray ΔP | Bubbling Pattern | Perforated Cap (14 of 77) Performance |
| | | | | | INCHES H₂O | | | | |
| 26 | 1846 | 41.8 | 2.5:1 | 4:1 | 2½ | 2½ | 1.93 | Tray fully active, all caps bubbling | |
| 27 | 2000 | 80.3 | 2.3:1 | 2:1 | 2¾ | 2¾ | 2.28 | Agitated bubbling on whole tray | |
| 28 | 2000 | 144.6 | 2.3:1 | 1.2:1 | 3½ | 3 | 2.78 | Agitated bubbling on whole tray | |
| 29 | 3384 | 18.2 | 1.4:1 | 9:1 | F | F | 2.84 | Considerable agitated bubbling on whole tray | |
| 30 | 3537 | 87.8 | 1.3:1 | 2:1 | F | F | 3.48 | Considerable agitated bubbling on whole tray | |
| 31 | 3537 | 121.3 | 1.3:1 | 1.4:1 | F | F | 3.60 | Considerable agitated bubbling on whole tray | |
| 32 | 3922 | 139.0 | 1.2:1 | 1.2:1 | F | F | 3.80 | Agitated bubbling on whole tray | |
| 33 | 4000 | 4.09 | 1.1:1 | 41:1 | F | F | 2.71 | Agitated bubbling on whole tray | |
| 34 | 4000 | 79.1 | 1.1:1 | 2:1 | 2¾ | 2¾ | 3.63 | Agitated bubbling on whole tray | |
| 35 | 4000 | 144.7 | 1.1:1 | 1.2:1 | F | F | 4.04 | Agitated bubbling on whole tray | |

F—Frothy

Referring now to Table 1, the tray with 14 dual-slotted caps installed across the liquid pathway at the tray inlet, replacing 14 conventional caps, was found to provide satisfactory vapor/liquid contact over the entire range of flow rates required. Uniform bubbling through the second slot openings was achieved at vapor turndown ratios of 121:1 over a range of liquid turndown ratios from 1.1:1 to 45:1, providing uniform vapor contact with the liquid as it entered the tray and before any leakage occurred (Tests 1–10). At this low vapor rate, only the second slots (perforations) in the 14 dual-slotted inlet caps bubbled except for two tests (8 and 9) at liquid turndown ratios of 1.6–2:1 where 2 or 4 caps in the outlet row also bubbled.

At vapor turndown ratios of 18–23:1, fairly uniform bubbling was achieved over the entire tray with proportionally lower liquid rates, i.e. 44–210:1 turndown (Tests 12–13), but at high liquid rates, i.e. 1.1–1.6:1 turndown, bubbling occurred only in the second slots of the inlet caps and in the outlet row 7 caps and part of row 6 caps (Tests 15–16).

At vapor turndowns of 8–11:1, with proportionally higher liquid rates, i.e. 2.2–2.3:1 turndown, bubbling occurred only in the second slots of the inlet caps and in parts of the outlet rows 5, 6 and 7, such that liquid bypassing occurred around the active outlet area caps (Tests 18–19).

In all the above described tests (11–19) at intermediate vapor turndowns of 8–23:1, satisfactory vapor/liquid contact was achieved with the inlet caps having second slots, regardless of the erratic behavior of the remaining conventional caps, and regardless of the liquid bypassing which was observed in some tests at the tray outlet.

At normal vapor turndown ratios of 4–6:1 (Tests 20–23), fairly uniform bubbling was achieved except for some conventional caps in the inlet half of the tray. The perforated inlet caps provided good initial vapor/liquid contact and the conventional caps in the outlet half of the tray provided uniform bubbling.

At vapor rates above a turndown ratio of 2.5:1 (Tests 24–35), uniform and agitated bubbling was achieved over the entire tray at all liquid rates, as would be expected for a bubble-cap tray of good conventional design.

It was concluded that the perforated inlet caps would provide sufficient vapor/liquid contact at low vapor rates to achieve adequate mass transfer efficiency over the required ranges of vapor (79:1 turndown ratio) and liquid (210:1 turndown ratio) rates.

EXAMPLE 2

The procedure of Example 1 was repeated using air and water again as the test medium. However, the tray was equipped with conventional bubble caps only and a froth initiator of typical commercial design installed at the tray inlet. Table 2 below sets forth data from a series of tests using conventional caps in all 7 rows of the same tray as in Table 1, that is, without caps having second slot sections. The initial design of the froth initiator comprised 176 holes of ¼ inch diameter located in two rows, half at ½ inch above the tray floor and half at 1¾ inch above the tray floor.

TABLE 2

| | | | | | | Tests Without Dual-Slotted Caps and With Froth Initiator | | | |
|---|---|---|---|---|---|---|---|---|---|
| Test No. | Gas Rate ACFM | Liquid Rate GPM | Vapor Turndown Ratio | Liquid Turndown Ratio | Tray ΔP inches H₂O | Bubbling Pattern | Number of Froth Initiator Holes | Weeping Through Froth Initiator GPM | Leakage Through Tray Joints |
| 1A | 350 | 9.1 | 13:1 | 18:1 | 1.16 | Uneven# | 40 | 0 | 4.5* |
| 2A | 350 | 4.9 | 13:1 | 34:1 | 1.09 | " | 10 | 0 | 3.4* |
| 3A | 350 | 4.8 | 13:1 | 35:1 | 0.94 | " | 0 | 0 | 3.4* |
| 4A | 350 | 8.4 | 13:1 | 20:1 | 1.26 | " | 40 | 0 | 1.1 |
| 5A | 350 | 8.4 | 13:1 | 20:1 | 1.17 | " | 88 | 2.1 | 1.1 |

TABLE 2-continued

| | | | | Tests Without Dual-Slotted Caps and With Froth Initiator | | | | | |
|---|---|---|---|---|---|---|---|---|---|
| Test No. | Gas Rate ACFM | Liquid Rate GPM | Vapor Turndown Ratio | Liquid Turndown Ratio | Tray Δ P inches H₂O | Bubbling Pattern | Number of Froth Initiator Holes | Weeping Through Froth Initiator GPM | Leakage Through Tray Joints |
| 6A | 350 | 8.4 | 13:1 | 20:1 | 0.94 | " | 176 | 4.7 | 1.1 |

*After tests 1A, 2A, & 3A, the tray was modified to reduce leakage through tray joints.
Details of bubbling pattern not reported due to unsatisfactory performance of tray.

As noted from Table 2, the froth initiator was found to be unsatisfactory for the intended service, since at moderate vapor rates, 13:1 turndown ratio, 4.7 GPM of liquid weeped (leaked) through the froth initiator holes, thus completely bypassing the tray (Test 6A). Weepage was eliminated by reducing the number of froth initiator holes to 40 or less at the 13:1 vapor turndown (Tests 1A-4A), but reoccurred at lower vapor rates (not reported here), in some cases bypassing all of the liquid and resulting in no liquid flow across the tray.

EXAMPLE 3

The procedure of Example 2 was repeated again with all conventional caps except that the tests were made without a froth initiator.

The results are set forth in Table 3.

TABLE 3

| | | | | | Tests Without Dual-Slotted Caps and Without Froth Initiator | | | | |
|---|---|---|---|---|---|---|---|---|---|
| Test No. | Gas Rate ACFM | Liquid Rate GPM | Vapor Turndown Ratio | Liquid Turndown Ratio | Tray Δ P inches H₂O | Bubbling Pattern | Number of Froth Initiator Holes | Weeping Through Froth Initiator GPM | Leakage Through Tray Joints |
| 1B | 1100 | 143 | 4:1 | 1.2:1 | — | Only rows 5, 6 & 7 bubble | — | — | 7.7 |
| 2B | 1100 | 143 | 4:1 | 1.2:1 | 2.46 | Only rows 5, 6 & 7 bubble | — | — | 7.7 |
| 3B | 860 | 141 | 5:1 | 1.2:1 | 2.42 | Only rows 5, 6 & 7 bubble | — | — | 7.7 |
| 4B | 860 | 14 | 5:1 | 12:1 | 1.48 | Uniform | — | — | 0.4 |
| 5B | 2590 | 3.7 | 1.8:1 | 45:1 | 1.78 | Uniform | — | — | 0 |
| 6B | 510 | 8.5 | 9:1 | 20:1 | 1.33 | Uniform | — | — | 0.4 |
| 7B | 510 | 89 | 9:1 | 1.9:1 | 2.03 | Only outlet rows 6 & 7 and half of row 5 bubble | — | — | 5.0 |
| 8B | 668 | 89 | 7:1 | 1.9:1 | 2.08 | Only rows 5, 6, 7 and half of row 4 bubble | — | — | 4.9 |
| 9B | 668 | 91 | 7:1 | 1.9:1 | 2.10 | Only rows 5, 6, 7 and half of row 4 bubble | — | — | 5.3 |
| 10B | 350 | 143 | 13:1 | 1.2:1 | 2.21 | Only outlet rows 6 & 7 bubble | — | — | 7.6 |

The results indicate that fairly uniform bubbling could be achieved at vapor turndown ratios as low as 9:1 but only if liquid rates were proportionally lower (i.e., liquid turndown lower than vapor turndown) (Tests 4B-6B). For example, at vapor turndown ratios of 4-5:1, only the 3 outlet rows of caps bubbled when liquid rates were proportionally higher (i.e., vapor turndown lower than liquid turndown) (Tests 1B-3B). At vapor turndown ratios of 7-13:1, again only the outlet rows of caps bubbled when liquid rates were proportionally higher (Tests 7B-10B).

At vapor turndowns lower than 13:1 (not reported here), bubbling became erratic and non-uniform, resulting in liquid bypassing around the active (bubbling) caps. Leakage through the tray joints was of great concern, since only caps in the outlet rows were bubbling and liquid which leaked through the tray did not contact the active caps.

As a result of these tests, it was confirmed that the tray with all conventional caps could not accommodate the required vapor and liquid load ranges in such a manner as to assure the level of vapor/liquid contact necessary for adequate mass transfer efficiency under actual operating conditions.

As can be seen from the data set forth for Examples 1, 2 and 3, very wide vapor and liquid load ranges can be tolerated by the tray of Example 1. At low vapor rates it is evident from Tables 2 and 3 that the tray of Example 1 would have been unstable at some liquid rates without the perforated bubble caps having first and second slot openings. Further, the tray of Example 2, although having a wider turndown ratio than the tray of Example 3, did have unsatisfactory levels of weeping associated therewith.

We claim:

1. In a distillation process wherein a volatile component is separated from a less volatile component in a multicomponent feed which comprises charging said multicomponent feed to a distillation column having a plurality of trays with a plurality of bubble caps thereon equipped with riser sections and first slot openings, converting said multicomponent feed into a liquid fraction and a vapor fraction, passing said liquid fraction from an inlet section to an outlet section on said trays and contacting said bubble caps, passing said vapor fraction through said riser sections and out said first slot openings in said plurality of bubble caps for contacting the liquid fraction on said trays, removing said volatile component as an overhead stream, and removing said less volatile component as a bottoms stream; the improvement for accommodating variable vapor and liquid loads to the trays resulting from the utilization of a multicomponent feed having a wide concentration range of said volatile component or resulting from varying rates of said feed to the distillation column without drastically reducing tray mass transfer efficiency comprising:

utilizing a plurality of unique bubble caps which have second slot openings in addition to said first slot openings, said unique bubble caps being disposed in one or more rows across the width of the liquid pathway from the inlet section to the outlet section on said trays, said first slot openings in all caps being at a level below the liquid level on said trays, such level defining a liquid head Z1 and said second slot openings in said unique caps being at a level below the liquid level on said tray, such level defining a liquid head Z2 with Z2 being less than Z1, and said second slot openings in each said unique cap having a total cross-sectional area of from about 5 to about 30% of the total cross-sectional slot area of said first slot openings in each said cap.

2. The distillation process of claim 1 wherein a majority of the cross-sectional area provided by said second slot openings in said unique bubble caps is upstream from an imaginary plane cutting through the center of said unique bubble caps and perpendicular to the direction of liquid flow across said trays.

3. The distillation process of claim 2 wherein the distance from the liquid level on said trays to said first slot openings is expressed as Z1 and the distance from said liquid level to said second slot openings is expressed as Z2, the ratio of Z2 to Z1 is from about 0.1 to 0.5:1.

4. The distillation process of claim 3 wherein a majority of said second slot openings are substantially at the same elevation above said first slot openings.

5. The distillation process of claim 4 wherein said unique bubble caps are disposed in from one to three rows across the width of the liquid pathway on said trays and generally near the liquid inlet section of said trays.

6. The distillation process according to claim 5 wherein said unique bubble caps having first and second slot openings comprise 5 to 30% of the total bubble caps on said trays.

7. In a bubble cap suited for effecting distillation of a multicomponent feed comprising a cap portion, a riser section disposed internally to said cap portion for permitting vapor flow therethrough and a plurality of first slot openings at a level below the outlet of the riser, the improvement for enhancing the mass transfer efficiency of said bubble cap with respect to variable vapor and liquid loads to a tray which comprises a plurality of second slot openings in addition to said first slot openings, said first slot openings being substantially uniformly located about the perimeter of said cap and further said second slot openings being on one side of an imaginary plane cutting through the center of said cap, said second slot openings having a total cross-sectional area from about 5 to about 30% of the total cross-sectional area of said first slot openings in said cap.

8. The bubble cap of claim 7 wherein a majority of said second slot openings are substantially at the same elevation above said first slot openings.

9. The bubble cap of claim 8 wherein the cap is placed in a liquid pathway, the liquid being above the first and second slot openings and further, the distance from the liquid level to said first slot openings is expressed as Z1 and the distance from said liquid level to said second slot openings is expressed as Z2, the ratio of Z2 to Z1 is from about 0.1 to 0.5:1.

10. The bubble cap of claim 9 wherein said second slot openings are distributed substantially uniformly on one side of the imaginary plane.

11. A bubble tray for contacting liquid and vapor over wide ranges of vapor and liquid flow rates comprising:
(a) a tray floor having a liquid entrance zone, a liquid outlet zone, and a liquid pathway between said entrance and said outlet zones;
(b) a plurality of bubble caps equipped with riser sections and first slot openings and disposed on said floor in rows traversing the width of said liquid pathway;
(c) a downstream overflow weir traversing said liquid pathway on said tray and capable of establishing a liquid level on said tray; and
(d) a plurality of unique bubble caps disposed in one or more of said rows which have second slot openings in addition to said first slot openings; whereby said second slot openings are disposed in said unique bubble caps at a level below the liquid level on said bubble tray but above said first slot openings, said second slot openings in each unique cap having a total cross-sectional area of from about 5 to about 30% of the total cross-sectional area of said first slot openings in each cap.

12. The bubble tray of claim 11 wherein a majority of the cross-sectional area of said second slot openings in said unique caps is upstream from an imaginary plane cutting through the center of said unique bubble caps and perpendicular to the directions of liquid flow across said tray.

13. The bubble tray of claim 12 wherein a majority of said second slot openings are substantially at the same elevation above said first slot openings.

14. The bubble tray of claim 13 wherein the distance from the liquid level on said tray to said first slot openings is expressed as Z1 and the distance from said liquid level to said second slot openings is expressed as Z2, the ratio of Z2 to Z1 is from about 0.1 to 0.5:1.

15. The bubble tray of claim 14 wherein said unique bubble caps are disposed in from to 1 to 3 rows across the width of the liquid pathway on said tray and near said liquid entrance zone of said tray.

16. The bubble tray of claim 15 wherein said unique bubble caps having first and second slot openings comprise 10 to 20% of the total bubble caps on said tray.

* * * * *